United States Patent
Fukutani et al.

[11] Patent Number: 5,998,898
[45] Date of Patent: Dec. 7, 1999

[54] MOTOR HAVING HYDRODYNAMIC BEARING

[75] Inventors: Hideshi Fukutani; Akihiko Wakitani, both of Yonago, Japan

[73] Assignee: Matsushita Electric Industrial Co., Ltd., Osaka, Japan

[21] Appl. No.: 09/207,504

[22] Filed: Dec. 9, 1998

[30] Foreign Application Priority Data

Dec. 19, 1997 [JP] Japan .................................. 9-350458
Feb. 27, 1998 [JP] Japan ................................. 10-046961

[51] Int. Cl.$^6$ .............................. H02K 5/16; F16C 32/06
[52] U.S. Cl. ............................ 310/90; 384/100; 384/114; 384/123
[58] Field of Search .............................. 310/90; 384/100, 384/105, 107, 114, 112, 115, 121, 123

[56] References Cited

U.S. PATENT DOCUMENTS

| | | | |
|---|---|---|---|
| 4,555,186 | 11/1985 | Scruggs | 384/93 |
| 4,652,149 | 3/1987 | Nakaoka et al. | 384/100 |
| 4,838,710 | 6/1989 | Ohta et al. | 384/100 |
| 5,019,738 | 5/1991 | Weilbach et al. | 310/90 |
| 5,089,732 | 2/1992 | Konno et al. | 310/67 R |
| 5,315,196 | 5/1994 | Yoshida et al. | 310/90 |
| 5,357,163 | 10/1994 | Minakuchi et al. | 310/90 |
| 5,366,298 | 11/1994 | Toshimitsu et al. | 384/107 |
| 5,457,588 | 10/1995 | Hattori et al. | 360/99.08 |
| 5,683,183 | 11/1997 | Tanaka et al. | 384/100 |
| 5,769,544 | 6/1998 | Suzuki et al. | 384/115 |

FOREIGN PATENT DOCUMENTS

| | | | |
|---|---|---|---|
| 59-89823 | 5/1984 | Japan | F16C 33/12 |
| 61-112818 | 5/1986 | Japan | F16C 33/12 |

*Primary Examiner*—Nestor Ramirez
*Assistant Examiner*—Burton Mullins
*Attorney, Agent, or Firm*—Wenderoth, Lind & Ponack, L.L.P.

[57] ABSTRACT

Herringbone grooves are formed on an inner wall of a sleeve through which a motor shaft is inserted. Lubricating fluid is provided between a space between the shaft and the sleeve so as to form a relatively rotatable radial dynamic pressure bearing. A surface layer and the herringbone grooves on an inner wall of the sleeve, which are sliding regions with the motor shaft, have a different hardness from that of a base material of the sleeve. The hardness ratio of these two elements is set so that the shaft spins without wearing itself out as well as the sleeve surface layer. As a result, a highly reliable motor is achieved because the structure can maintain accurate whirling and suppress seizure due to abrasion powder between the shaft and the sleeve.

8 Claims, 10 Drawing Sheets

MOTOR HAVING HYDRODYNAMIC BEARING

FIELD OF THE INVENTION

The present invention relates to motors mounted to disc driving apparatuses, laser beam printers and the like for the information processing field. More particularly, the present invention relates to the structure of motors having hydrodynamic bearings.

BACKGROUND OF THE INVENTION

The development of disc driving apparatus utilized in the information processing field demands ever increasingly thinner dimensions and higher storage capacity. Specifically, higher performance, lower noise, longer life and higher shock-resistance are required. These requirements entail the same demands of motors that are to be employed in the disc driving apparatus for driving discs.

The bearing of a motor is one of the key elements that determine the above-identified specifications. Most of the conventional magnetic disc driving apparatuses have employed ball bearings in their motors, where discs of 5.25", 3.5", 2.5" or 1.8" diameters are mounted.

However, the technology of the ball bearing cannot meet the above demands any longer, and thus attention is drawn to a hydrodynamic bearing. Recently, the market has developed a demand for a thinner disc driving apparatus having a longer life span. Thus the employment of the hydrodynamic bearing is further extensively required.

The trend toward the hydrodynamic bearing and away from the ball bearing is described herein with reference to the magnetic disc driving apparatus (hereinafter called "apparatus".)

Because of the advancement of multi-media technology handling audio data and picture data, the apparatus must have a higher capacity among other things. The higher capacity requirement entails the higher recording density in the radius direction of the apparatus. The apparatus thus must accommodate a narrower pitch, which requires a lower NRRO (Non Repeatable Runout) of both a motor-hub spinning with a disc and the disc fixed to the hub.

The NRRO is an irregular shaft-run-out among run-outs of a rotary shaft. Two kinds of run-outs are available. One synchronizes with the shaft rotation, and the other does not synchronize. The NRRO is an unsynchronized run-out. The NRRO should be thus reduced in order to avoid producing errors in read and write operations. A specific NRRO demand of both the hub and disc has been approximately 0.4 $\mu$m in a radial direction. However, 0.2 $\mu$m is demanded recently because narrower track pitches are required due to higher storage capacities. Further, a demand of not more than 0.05 $\mu$m is predicted in the future in order to accommodate the higher capacities.

It is well known that the NRRO of a conventional apparatus depends on the ball bearing that is one of the key parts of a disc driving motor. The ball bearing comprises an outer ring, inner ring, balls, holder, seal and grease.

A great dispersion on the NRRO can be produced by the following factors: (1) mechanical accuracy of a ball bearing, (2) a method of pre-loading the ball bearing, (3) control of the pre-loading thereof, and (4) assembling accuracy of the ball bearing into a motor. Among others, the following factors greatly influence the NRRO: mechanical accuracy of outer ring and inner ring, ball sphericity, and relative error of ball outlook when the ball bearing is incorporated into the motor. It is thus difficult to reduce the NRRO when the motor has been completely assembled.

Noises such as lathe noise are produced in the ball bearing by rolling on a track ring, and noise is produced due to self-induced vibration of a holder by itself. Further, a number of rotations of the motor are increased from 3600 rpm to 7200 rpm because the market demands a faster speed. As a matter of fact, a motor of 10000 rpm will a debut on the market. As such, the faster rotational speed of the motor produces larger noises, and the market demands lowering of the noises. In fact, the technology of the ball bearing hardly satisfies these demands.

According to a recent market trend, portable note-type personal computers have become disseminated in the market, and the apparatus therein employs a removable medium. This market trend requires that the motor be stronger against shock and drop. However, noise becomes greater when ca. 100 G acceleration due to shock or drop is applied to the ball bearing, because Brinell indentations are produced on a lathe face of the outer ring or inner ring. The technology of the ball bearing thus hardly meets the market demands, namely, a specific shock resistive value which is not less than 200 G.

The apparatus seals the entire motor assembly in a housing where the discs are mounted in order to always keep the apparatus clean. Because discs and magnetic heads are placed with extremely narrow spaces in between, when dust enters the space or hits either the disc or the head, the operation of read/write data is adversely affected. Therefore, the apparatus must be shielded from dust as mentioned above.

The space between the disc and head is presently ca. 0.1 m, however, it is necessary to reduce the space due to the demand for higher capacities. The construction of the motor does not allow the ball bearing to be lubricated, thus a grease-sealed type ball bearing is employed. The grease comprises base oil and thickener, both of which receive a shearing force due to spinning and start separating. The base oil and thickener spread to the discs, which damages the functions of the apparatus and resultant defects occur.

The above problems are caused by the ball bearings that the conventional motors employ. Therefore, employment of a hydrodynamic bearing in the motor can solve the above problems.

The hydrodynamic bearing comprises a cylindrical motor shaft and a hollow tubular sleeve in which the motor shaft is inserted with an annular clearance. On either the motor shaft or the sleeve, a plurality of herringbone-grooves are provided, and in the annular clearance or space between the shaft and sleeve is filled with lubricating fluid (oil or grease is often used). Driving of the rotor produces a pumping operation between the herringbone grooves and the lubricating fluid so that a dynamic pressure is generated in the radial direction. The dynamic pressure centers the shaft in the bearing, so that the rotating shaft is supported within the sleeve or the rotating sleeve is supported by the shaft, in a contact-free manner. On the other hand, herringbone grooves or spiral grooves are provided on at least either one of a thrust face of a thrust ring fixed to the shaft or a thrust face of the sleeve. The lubricating fluid is poured into the space between both of the thrust faces of the thrust ring and the sleeve, and thus dynamic pressure supporting the thrust load is generated axially. As a result, the rotating sleeve is supported by the thrust ring fixed to the shaft in a contactfree manner.

Recently, there has been a desire to produce a thinner magnetic disc driving apparatus which has a longer life.

When the apparatus becomes thinner, the total height of the motor must be thinner because the height of the motor is restricted by the dimensions of the apparatus. An axial length of the sleeve, which lowers rigidity of the bearing, is difficult to obtain because the sleeve is a key element of the hydrodynamic bearing. As a result, mechanical contact is produced between the shaft and sleeve as well as between the sleeve thrust faces and the fixed ring thrust face due to starts and stops and overloading of the motor. These mechanical contacts cause abrasion and seizure at a sliding region between the shaft, which is made of stainless alloy, and the sleeve, which is made of copper system alloy, as well as between both of the thrust faces of the sleeve and the fixed thrust ring.

In the case of laser beam printers, a motor employed therein rotates only when letters or data are printed. The motor thus operates intermittently. Further, a function of power savings is incorporated into the motor, which halts the motor to eliminate consumption of electric power when the printer is not operated. As such, it has become a general trend for the motor to be used under a condition of repeating starts and stops.

When the laser beam printer becomes thinner in dimension, the height of motor is restricted to within the dimension of the printer, and therefore, the total height of motor must be lower. Then it is difficult to obtain an axial length of a sleeve, and therefore a bearing rigidity becomes insufficient.

The insufficient rigidity of the bearing entails mechanical contacts between a shaft and the bearing due to starts and stops, as well as over loading of the motor. As a result, abrasion and seizure are produced on a sliding region between the motor shaft made of stainless alloy and the bearing made of copper alloy.

Various proposals have been developed in an attempt to solve the above problems. U.S. Pat. No. 4,652,149 is one of the proposed solutions. This patent discloses the following advantages: a partial or entire bearing comprises self-lubricating resin such as polyacetal, nylon or the like, and this resin includes carbon fiber in a predetermined quantity so that electric conductivity is imparted to the resin. A motor shaft is plated with chromium (Cr), and thus the conductivity between the bearing and the motor shaft can be checked. This enables users to check whether metallic powder, which is harmful with regard to the width of clearance, exists between the motor shaft and the bearing, or whether contact exists between a fixed side and a rotating side.

However, since this bearing is formed partially or entirely by the self-lubricating resin, its hardness is lower than that of a regular bearing made of metal. The bearing disclosed by this U.S. Patent undergoes more abrasion than that experienced with the regular bearing. When the resin bearing is employed in a motor that rotates at a higher speed or undergoes frequent start and stop repetitions, a significant amount of abrasion occurs in the resin section. Therefore, this bearing is not recommended in motors which are employed in disc driving apparatuses and laser beam printers because of the life span of the bearing.

Another proposal is disclosed in U.S. Pat. No. 4,838,710. This patent discloses a static gas bearing which includes a gaseous fluid discharging member that supports a shaft. In other words, the bearing member is made of porous graphite, and the shaft surface is processed by ion plating and coated by titanium nitride so that the quality of the sliding surface of the shaft is improved.

Japanese Patent Application non-examined Publication No. S59-89823 also discloses some measure of protection against abrasion which includes a contacting face of a bearing that is coated by hard composite material such as titanium carbon and tungsten carbon through the ion plating method in order to provide abrasion-resistance to the bearing, which prevents the bearing from being worn.

In addition, the U.S. Pat. No. 4,555,186 discloses an improved bearing which includes a thin film made of amorphous alloy formed on a hollow cylindrical bearing. The Vickers hardness of the thin film is set to be not less than 1000.

As disclosed in U.S. Pat. No. 4,838,710 and Japanese Patent Application non-examined Publication No. S59-89823, the surfaces of the bearing and the sleeve are coated by hard material such as titanium carbon, tungsten carbon or titanium nitride through the ion plating method, thereby raising the hardness and improving the abrasion-resistance. However, the ion plating method entails temperatures rising up to ca. 300° C. in the process atmosphere. Materials having low fusing points such as the lead (Pb) included in the copper system alloy, which is a material of the sleeve, are deposited in this atmosphere. This deposition causes a failure of close contact between the coating layer and the surfaces as well as dispersion of a film thickness. This dispersion results in a reduced degree of precision with respect to the inner diameter of the sleeve. The ion plating method requires large equipment including a vacuum furnace, and further, this method takes well over half an hour to complete the process. Low productivity is, therefore, a disadvantage of this method.

The surface hardness of titanium carbon or tungsten carbon exceeds 2000 Vickers hardness. The hardness of the thin film made of amorphous alloy exceeds 1000 Vickers hardness as disclosed in U.S. Pat. No. 4,555,186. However, when the hardness of a bearing surface exceeds 1000 Vickers hardness, it is significantly harder than the surface hardness range of a shaft and a fixed thrust ring, i.e. 700±100 Vickers hardness. Thus, when the bearing of this combination operates for a long time, the shaft and fixed thrust ring will wear out.

Japanese Patent Application non-examined Publication No. S61-112818 is directed to improved abrasion resistance and discloses a boron (B) composite electroless nickel plating which is provided on the contacting surface of a bearing, thereby providing abrasion-resistance to the surface. It is preferable that a thickness of the plating ranges from 10 to 20 m and the surface has ca. 600 Vickers hardness.

However, the boron composite electroless nickel plating uses boron chloride as a reducing agent, and the film comprises Ni, P and B. This plating is expensive, and its plating bath has a problem with regard to stability. Further, when plating becomes thicker, a width of the herringbone grooves formed inside of the sleeve becomes narrower, which produces less rigidity of the shaft than a predetermined rigidity. The thickness of plating is proportional to plating time, and therefore, a thicker plating lowers productivity. It is concluded that this boron composite electroless nickel plating is not practical in a productivity-oriented manufacturing operation.

SUMMARY OF THE INVENTION

An object of the present invention is to provide a motor that is abrasion-free between a motor shaft and a sleeve, and which produces the following advantages in an operation where frequent start and stop repetition as well as overloading occurs. The motor can maintain a high whirling accuracy for a long time, and suppress seizure between the shaft and sleeve due to sliding abrasion powder, thereby realizing a high degree of reliability.

A structure of the motor according to the present invention is described hereinafter. Herringbone grooves are provided on the inner wall of the sleeve through which a motor shaft is inserted. The herringbone grooves contribute to the production of dynamic pressure. Lubricating fluid is provided between the sleeve and motor shaft so that a relatively rotary hydrodynamic bearing is formed. A sliding region between the shaft and sleeve, i.e. a radial surface and the herringbone grooves of the sleeve, has a different hardness relative to the hardness of the base material of the sleeve. This structure allows the bearing to be free from abrasion both on the sleeve surface and the shaft, and thereby to maintain a high degree of whirling accuracy for a long time. As a result, this structure improves reliability of the bearing.

The bearing of the present invention includes:

a motor shaft which is formed of stainless alloy of martensitic system, and a hardness range of the shaft surface is 700±100 Vickers hardness.

The bearing also includes a sleeve formed of copper system alloy.

Also, herringbone grooves are formed on an inner wall of the sleeve, and lubricating fluid is provided between the motor shaft and the sleeve.

These elements form a relatively-rotary-radial-hydrodynamic bearing, in which metal or carbon, different from the sleeve material, is implanted by the ion implantation method into a sliding region between the shaft and the sleeve, i.e. radial surface region and the herringbone grooves of the sleeve. This implantation can reform a sliding characteristic with little change in sleeve thickness.

The above structure forms a radial dynamic bearing that produces dynamic pressure to support a radial load. In addition to this, herringbone grooves or spiral grooves are provided on at least one of the thrust faces of a thrust ring fixed to the shaft or the sleeve. Lubricating fluid is provided in a space between both of the thrust faces so that dynamic pressure can be produced for supporting thrust load. The thrust dynamic bearing is thus formed. A thrust surface layer, which has a sliding relation with the thrust ring surface, is formed so that the hardness of the surface layer differs from the base material of the sleeve. This structure allows the motor to maintain a high whirling accuracy. As a result, the reliability of the motor is improved.

DETAILED DESCRIPTION OF THE PREFERRED EMBODIMENTS

The exemplary embodiments of the present invention are described hereinafter with reference to the accompanying drawings.

(Exemplary Embodiment 1)

Figure 1:
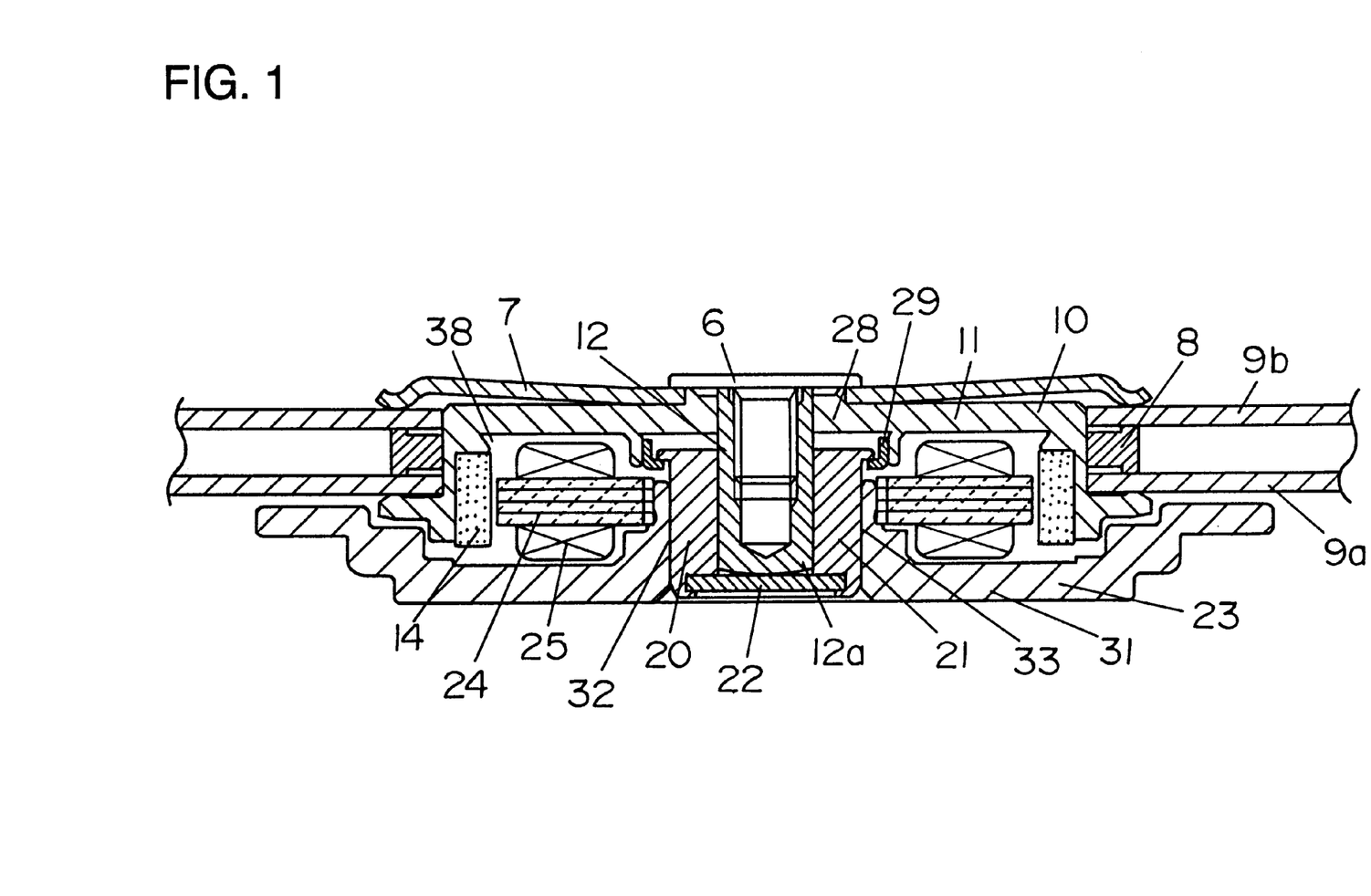
FIG. 1 is a cross section of a motor used in a first exemplary embodiment of the present invention.
Figure 2:
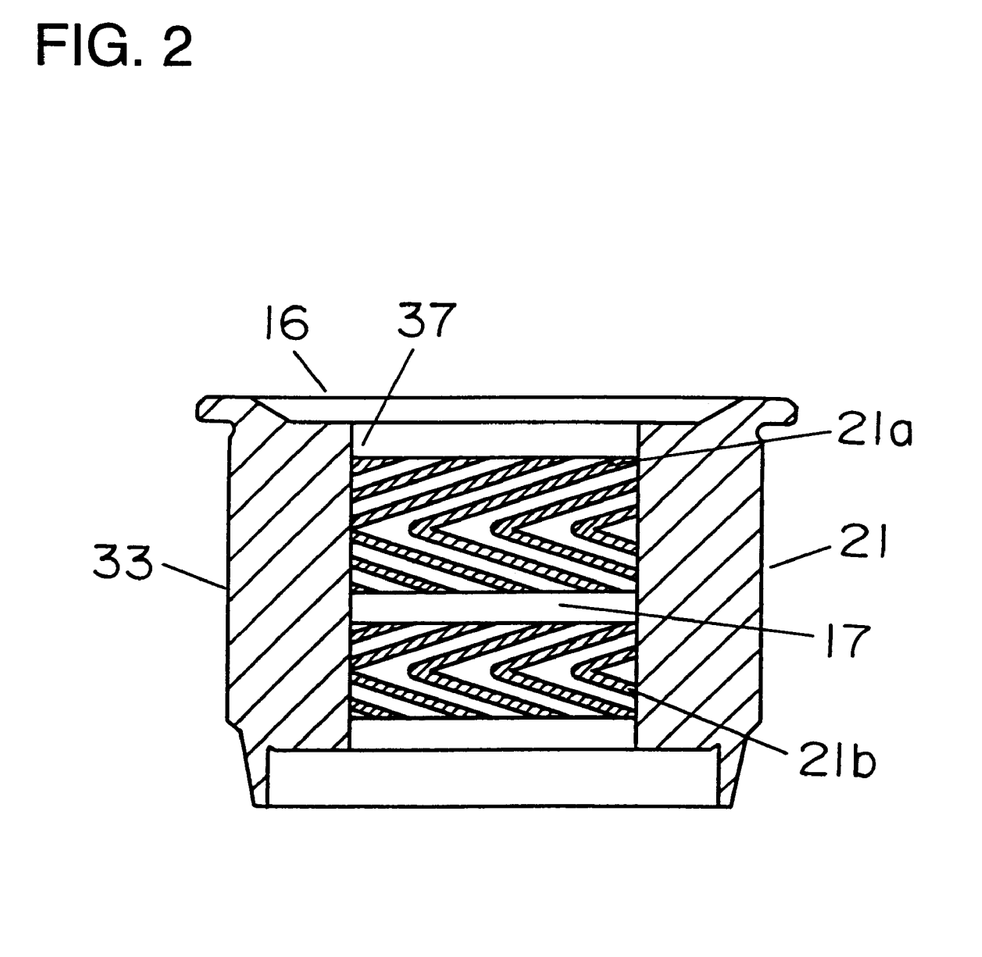
FIG. 2 is a cross sectional view of a motor sleeve used in the first exemplary embodiment of the present invention, the view is taken axially along the sleeve.

FIG. 1 is a cross section of a motor used in the first exemplary embodiment of the present invention, and FIG. 2 is a cross section viewed axially of the motor sleeve. This motor can to be mounted to a magnetic disc driving apparatus.

In FIGS. 1 and 2, a hub 11 is made of martensitic system or ferritic stainless steel, or free-cutting steel. Magnetic discs 9a and 9b are mounted to the rim of the hub. A motor shaft 12, made of stainless steel of martenstic system, is fixed in the center of the hub. The hub 11 spins together with the discs 9a and 9b. The shaft 12 is supported radially by a sleeve 21 made of cooper system alloy, and is also supported axially by a thrust plate 22.

The shaft 12, sleeve 21 and thrust plate 22 are made of metallic or ceramic material, and therefore, the shaft 12 and sleeve 21 have enough mechanical rigidity to bear the load and high speed rotation of the discs 9a and 9b. Further, the outer diameter of shaft 12 and the inner diameter of sleeve 21 can be accurately processed due to these materials.

Lubricating fluid such as oil or grease fills up the space between the shaft 12 and sleeve 21 as well as between the shaft 12 and thrust plate 22. Herringbone grooves 21a and 21b are formed axially with some interval on the inner wall 17 of the sleeve 21. When the shaft 12 spins, the herringbone grooves 21a and 21b produce pressure in the lubricating fluid so that the radial spinning of the shaft 12 can be in a contact-free manner. The herringbone grooves 21a and 21b can be formed on the surface of the shaft 12, instead of inside of the sleeve, and the same effect can be obtained. When the shaft 12 rotates, the thrust load applied to a shaft end 12a is borne by the thrust plate 22.

A stator core 24 is fixed to a bracket 23. The stator core 24 is wound with stator coil 25. The driving force of the motor is produced through the following processes. A current is applied to the stator coil 25 to energize the stator core 24 so as to produce a rotating-magnetic-field. Magnets 14 surrounding the stator core 24 are multipolar-magnetized. The rotating magnetic-field and the magnets 14 produce the driving force for the motor. The magnets 14 are fixed to the inside of the hub 11. The magnets 14 and the hub 11 constitute a rotor 10.

The assembly of the motor will now be described. The stator core 24, wound with the stator coil 25, is mounted to a bracket 23, thereby forming a bracket assembly 31. The thrust plate 22 is mounted to the lower end of the sleeve 21 by caulking or the like, thereby forming a sleeve assembly 20. One end of the shaft 12 is fixedly mounted to the center hole of the hub 11 by shrink fitting or the like, thereby forming a hub assembly 28.

Then, the lubricating fluid is poured in a predetermined quantity into the interior of the sleeve 21 of the sleeve assembly 20. After this, the hub assembly 28 is inserted into the interior of the sleeve 21 from the shaft end 12a side. Then, a stopper plate 29 is mounted to the hub 11 in order to prevent the rotor 10 from coming off. Finally, the outer circumference 33 of the sleeve 21 of the sleeve assembly 20 is inserted and fixed in the inside 32 of the bracket 23 of the bracket assembly 31. The motor is thus assembled.

Next, the disc 9a is mounted on the rim of the hub 11, and then the disc 9b is mounted with a spacer 8 in between. The discs 9a and 9b are fixed to the hub 11 with a screw 6 via clamping plate 7.

A space 37 is reserved at an open-end side of the sleeve 21 for storing the lubricating fluid so that the fluid is prevented from being splashed when the shaft 12 is inserted into the sleeve 21. An oil reservoir 38 is provided inside of the hub 11 to receive the fluid if the fluid is splashed out from the space 37 for some reason.

Figure 3:
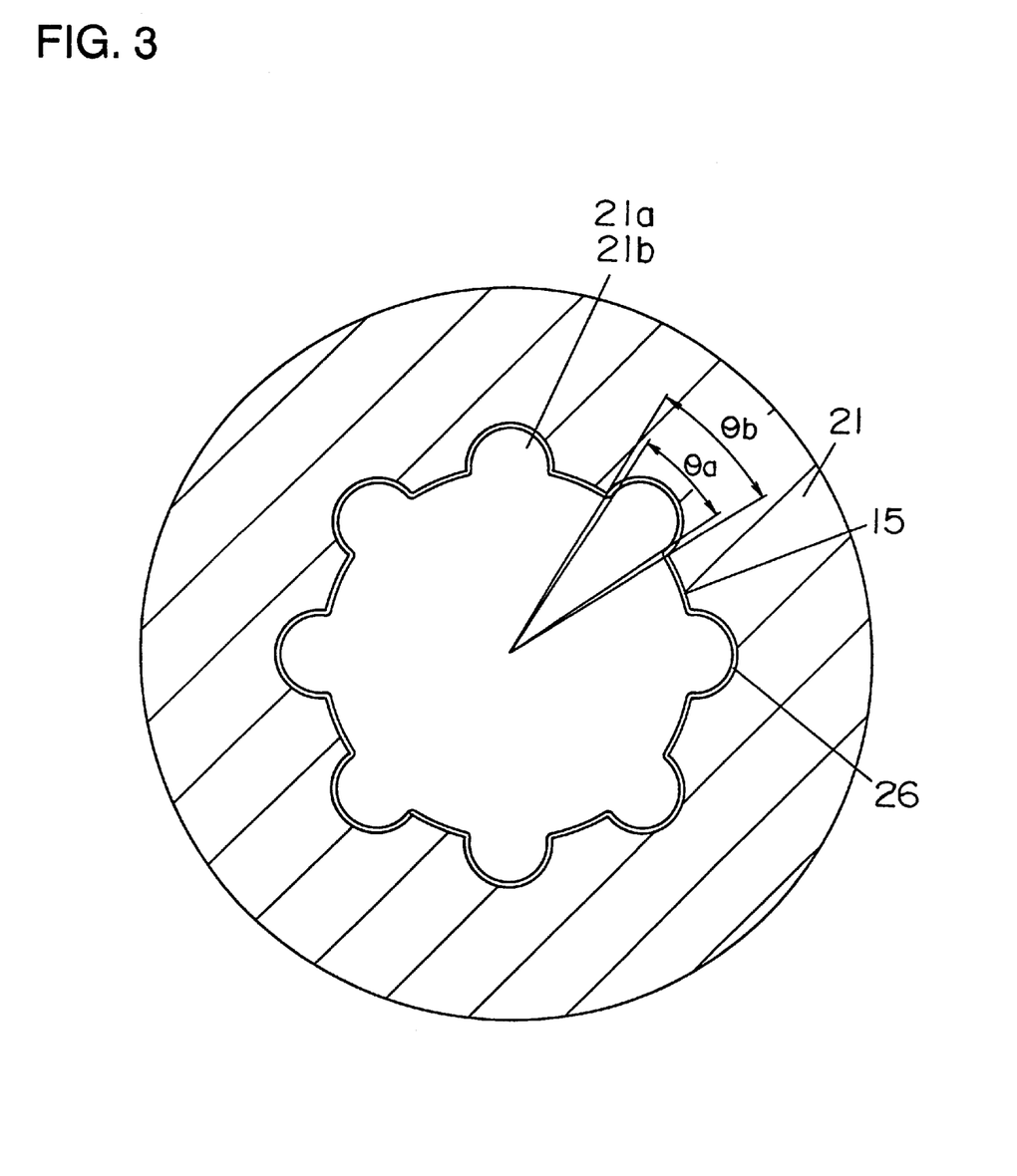
FIG. 3 is a cross sectional view of the motor sleeve used in the first exemplary embodiment of the present invention, the view is taken along a radial direction of the sleeve.
Figure 4:
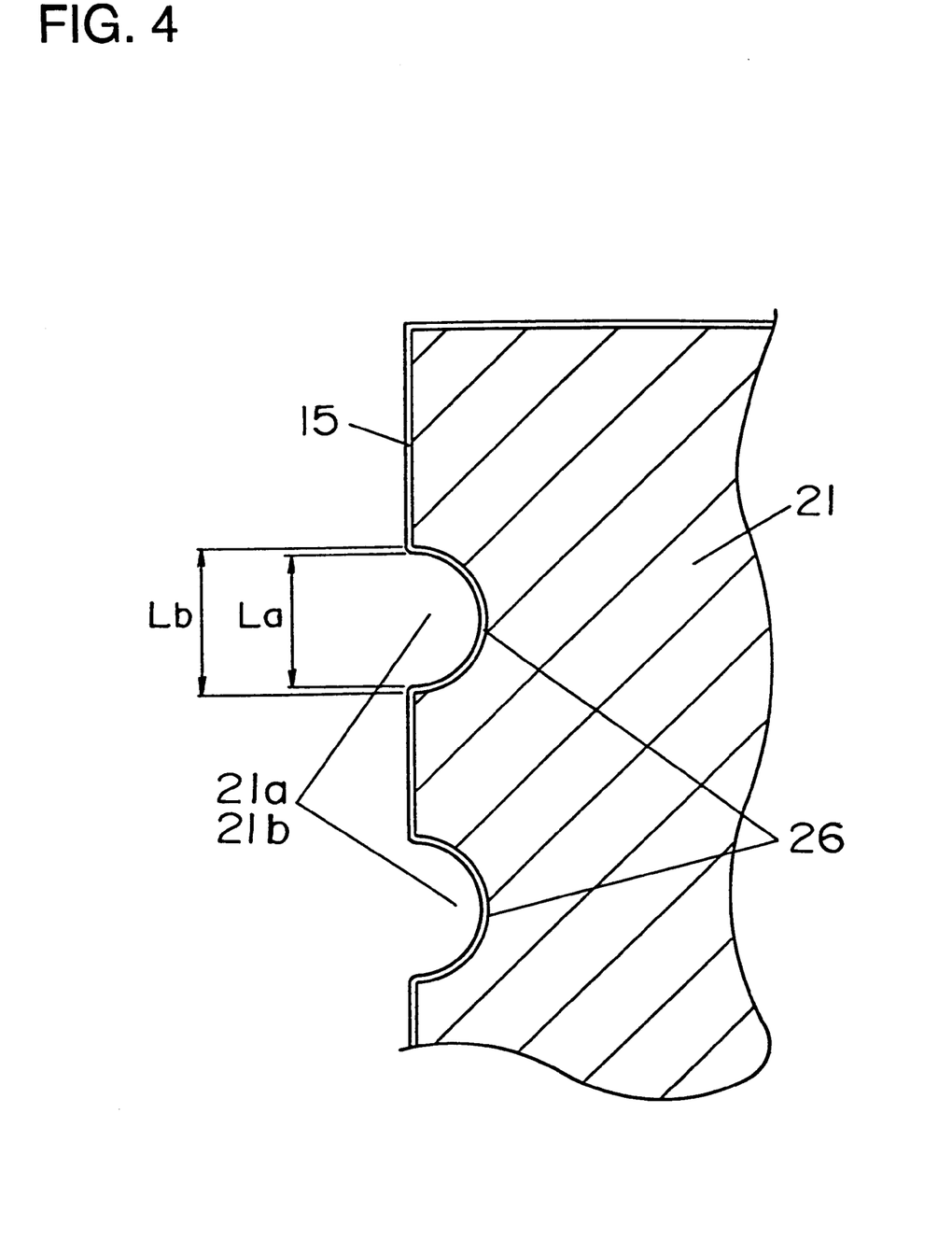
FIG. 4 is a cross sectional view of a partially enlarged sleeve of the motor used in the first exemplary embodiment of the present invention.

A structure of the sleeve 21 is described in detail with reference to FIGS. 3 and 4. FIG. 3 is a cross sectional view of the motor sleeve used in the first exemplary embodiment of the present invention, the view is taken in the radial direction of the sleeve.

The sleeve 21 is made of copper alloy and thus is very soft. Therefore, its surface is processed by electroless nickel plating and turned into hard surface. The electroless nickel plate comprises mainly nickel (Ni) (90–98%) and phosphorus (P) (2–10%). Thus, the surface has a different hardness relative to the base material of the sleeve 21. Specifically, as shown in FIGS. 3 and 4, radial surface layer 15 and herringbone grooves 26 are formed on the surface of the sleeve 21. The hardness of the radial surface layer 15 and the herringbone grooves 26 is different from that of the base material of the sleeve 21. The shaft 12 is made of stainless steel of martensitic system, i.e. JIS-SUS420J2 stainless steel undergone quenching, the range of the surface hardness thereof is ca. 700±100 Vickers hardness.

Figure 5:
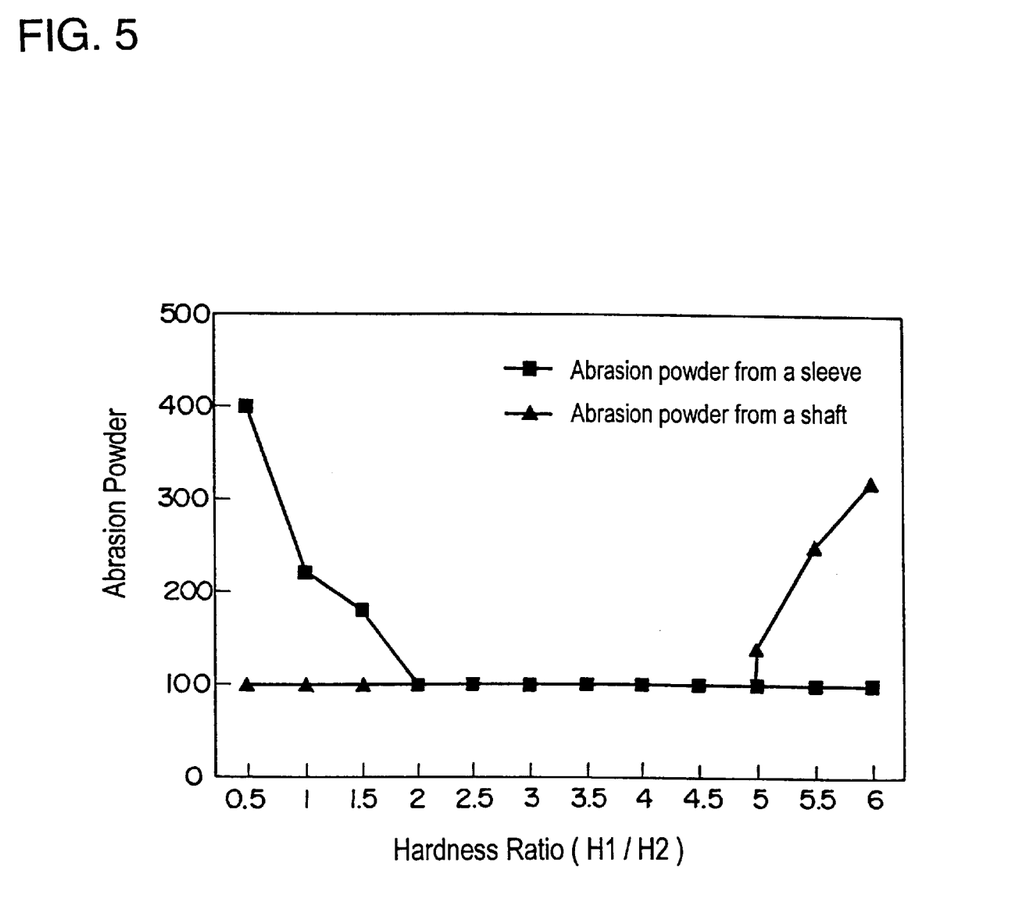
FIG. 5 is a chart illustrating a hardness ratio (H1/H2) of a radial surface layer and herringbone grooves (H1) vs. a base material of the sleeve (H2) of the motor used in the first exemplary embodiment of the present invention, the chart also illustrates a relation between abrasion powder and the ratio of the hardness (H1/H2).

FIG. 5 is a chart illustrating a hardness ratio (H1/H2) of the radial surface layer and the herringbone grooves (H1) vs. the base material of the sleeve (H2) of the motor used in the exemplary embodiment, the chart also illustrates a relation between abrasion powder and the ratio of the hardness (H1/H2).

In FIG. 5, the X-axis shows the ratio of H1/H2, the Y-axis shows a normalized amount of abrasion powder included in the lubricating fluid poured into the space between the shaft 12 and sleeve 21. The amount is measured after a reliability test. The amount of abrasion powder, which is included in the lubricating fluid of a motor that is judged as "good" at the reliability test, is set at "100" on this Y axis. Clearly, the less the amount of abrasion powder, the higher the reliability of the motor.

As shown in FIG. 5, when the ratio of H1/H2 is less than "2", a large amount of abrasion powder is produced from the sleeve 21. This is because the hard shaft 12 wears out the soft sleeve 21. On the contrary, when the ratio exceeds "5", a large amount of abrasion powder is produced from the shaft 12. At this ratio, the surface layer 15 has an excessive and greater hardness than the shaft 12 due to the hardening process, and thus the surface layer 15 of the sleeve 21 wears out the shaft 12.

As such, if the ratio of H1/H2 is outside of a proper range, the production of the abrasion powder is not suppressed, which affects the reliability of the motor. The whirling accuracy of the motor is thus lowered, which results in failures of the apparatus.

Since a disc driving apparatus, among others, is frequently operated as an outer memory of a computer, the repeating frequency of start and stop of the motor is higher than that of audio and video apparatuses and others. Therefore, users must pay attention to the abrasion and the accompanying powder due to the contact between the sleeve and shaft, which is produced by the frequent start and stop repetitions.

As described above, the herringbone grooves 21a and 21b are provided on an inner wall of the sleeve 21, through which the motor shaft 12 is inserted. Lubricating fluid is poured between the sleeve 21 and the shaft 12 so that a relatively rotary hydrodynamic bearing is formed. A sliding region between the shaft 12 and sleeve 21, i.e. the radial surface layer 15 and herringbone grooves 26 both inside the sleeve, have a different hardness from a base material of the sleeve 21. This structure enables the bearing to be free from abrasion between the sleeve surface and the shaft surface. As a result, the abrasion on the sleeve 21 is suppressed, thereby preventing seizure of the bearing.

Preferably, the hardness ratio of H1/H2 ranges from 2 to 5 (inclusive both ends), and the range of H1 is 700±100 Vickers hardness, and thereby the sleeve 21 is prevented from being worn out due to start and stop repetitions as well as an over-loaded operation. H1 is the hardness of the radial surface layer 15 and the herringbone grooves 26 and H2 is the hardness of the base material of the sleeve 21.

Copper system alloy is utilized as a material of the sleeve 21, and stainless steel alloy of martensitic system is utilized as a material of the shaft 12, so that the hardness range of the shaft 12 is 700±100 Vickers hardness. This structure can reduce abrasion of the shaft 12.

The inner wall of the sleeve 21 is now described in detail below.

The thickness of the electroless nickel plate on the radial surface layer 15 and the herringbone grooves 26 on the inner wall of the sleeve 21 is sufficient, if it is not less than 3 μm, from a reliability point of view. When a thicker plating is applied, the same thicker plating also coats the herringbone grooves 21a and 21b. A groove angle "Øb" prior to the plating changes to a smaller groove angle "Øa" due to the thickness of the plating. As shown in FIG. 4, a groove width "Lb" prior to the plating changes to a narrower width "La" by approximately the thickness of the plating.

The dimensions of groove angle and width of the herringbone grooves 21a and 21b are influential factors in relation to a producing force of dynamic pressure that realizes the contact-free rotation between the shaft 12 and the sleeve 21. The thicker the plating, the greater the change in the groove dimensions, and the planned force of producing dynamic pressure thus cannot be obtained. Therefore, the plating thickness should be within a proper range.

A plating thickness which exceeds a proper value degrades performance of the hydrodynamic bearing from the standpoints of reliability of the motor and stability of producing the dynamic pressure. The plating thickness range is preferably from 3 to 10 μm (inclusive of both of the ends).

According to the present invention, the electroless nickel plating is provided so that the thickness of the radial surface layer 15 and the herringbone grooves 26 range from 3 to 10 μm (inclusive of both of the ends), and also each thickness thereof is approximately the same. The resultant groove dimensions, including the groove angle and the width, change so little that performance of the hydrodynamic bearing is not degraded. Since the plating thickness is not more than 10 μm, the plating process does not take an excessive amount of time, thereby a high productivity can be realized.

The above embodiment discusses the electroless nickel plating applied to the radial surface layer 15 and the herringbone grooves 26. And yet, another method for hardening these sections is available; metal ion or carbon ion different from the material of the sleeve 21 is implanted on the surface layer 15 and the herringbone grooves 26. The implanted ion is preferably at least one of Ni, Ti and Cr.

A metal ion or a carbon ion properly selected is implanted to reform the surfaces of the radial surface layer 15 and the herringbone grooves 26, so that the implanted surfaces become harder and abrasion thereof is suppressed. A prior art ion plating method increases thickness of processed regions, which changes spaces in the bearing, and thus rigidity of the bearing is affected. This ion implanting method can reform the surfaces with little increase of thickness, outer and inner dimensions, which results in a higher degree of reliability without influencing the rigidity of the bearing.

(Exemplary Embodiment 2)

Figure 6:
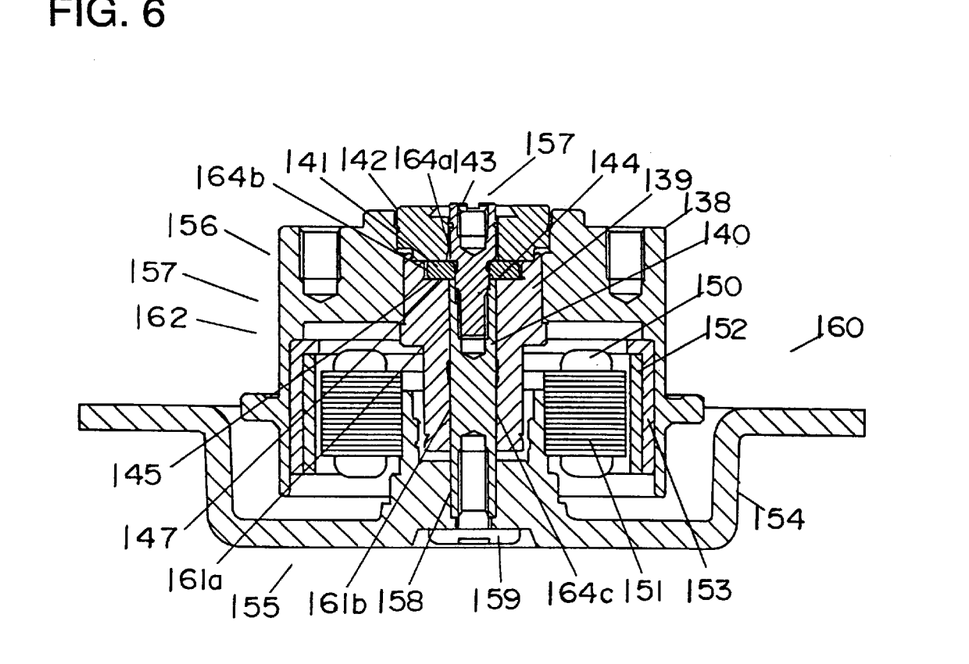
FIG. 6 is a cross section of a motor used in a second exemplary embodiment of the present invention.
Figure 7:
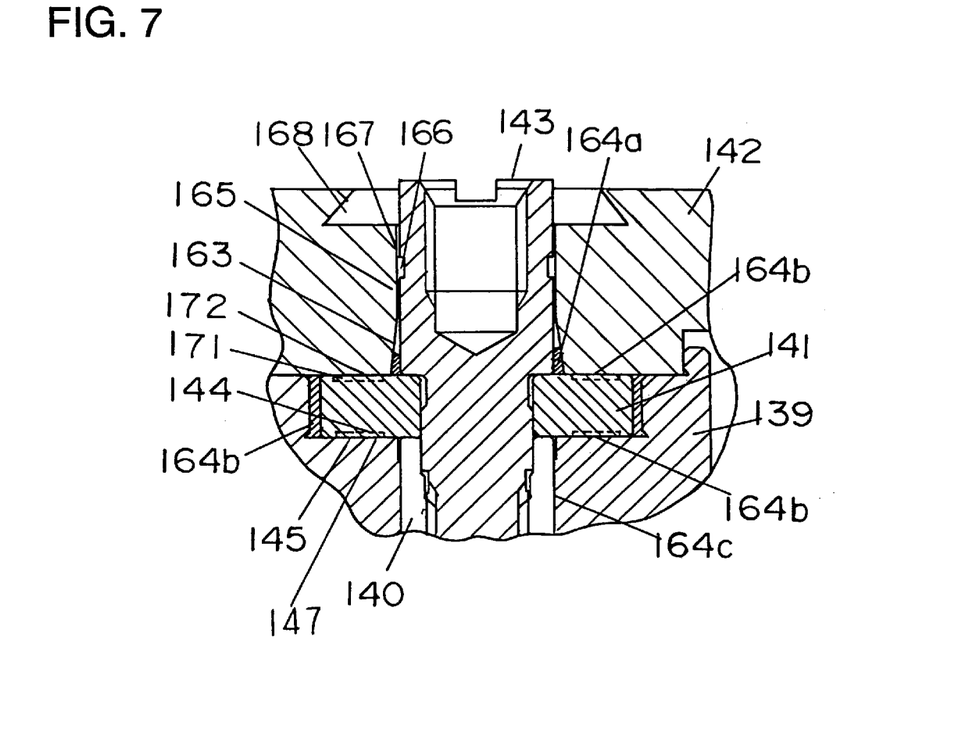
FIG. 7 is a cross section of a thrust dynamic pressure bearing employed in the motor used in the second exemplary embodiment of the present invention.

FIG. 6 is a cross section of a motor used in the second exemplary embodiment of the present invention, and FIG. 7 is a cross section of a thrust dynamic bearing employed in the motor. This motor is also an example of a motor which can be mounted to a magnetic disc driving apparatus as in the exemplary embodiment 1.

In FIGS. 6 and 7, magnetic discs (not shown) made of aluminum alloy are fixedly mounted to the rim of the hub 138, and the discs rotates together with the hub.

A radial dynamic bearing includes:
a sleeve 139,
herringbone grooves 161a and 161b formed inside of the sleeve 139.
lubricating fluid 164c, and
a motor shaft 140.

To be more specific, the sleeve 139 is made of copper alloy or aluminum alloy, and both of the materials can be easily processed. The sleeve 139 is mounted inside of the hub center. On an inside wall of the sleeve 139, herringbone grooves 161a and 161b are formed axially with some interval. The radially rotatable hub 138 is supported in a contact-free manner by dynamic pressure produced by pumping of the lubricating fluid 164 applied to the space between the sleeve 139 and the shaft 140.

Figure 8A:
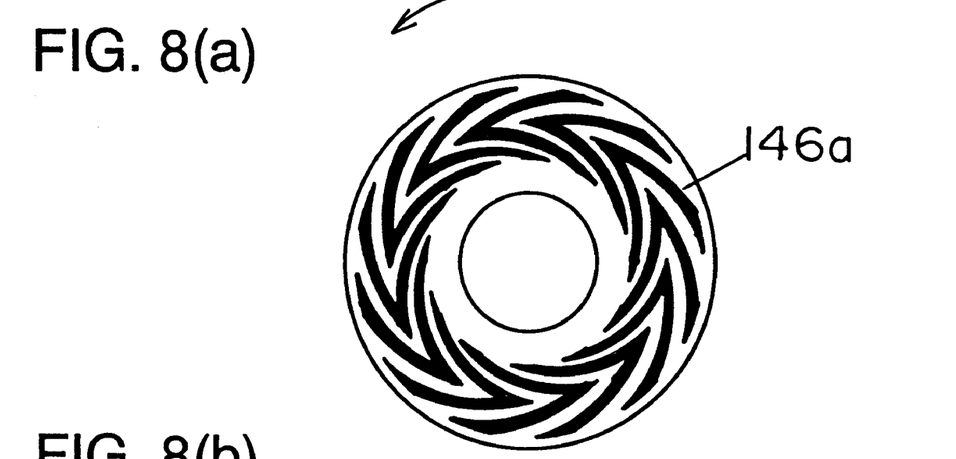
FIG. 8(a) is a top view of a fixed thrust ring of the motor used in the second exemplary embodiment of the present invention.
Figure 8B:
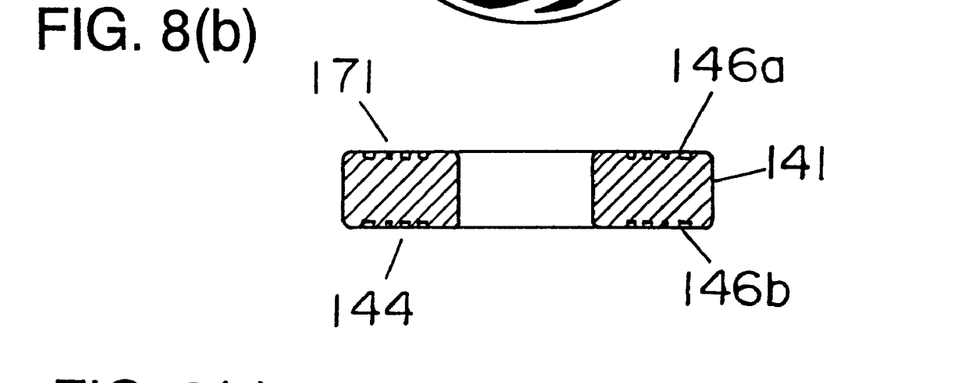
FIG. 8(b) is a cross section viewed from the front of the fixed thrust ring of the motor used in the second exemplary embodiment of the present invention.
Figure 8C:
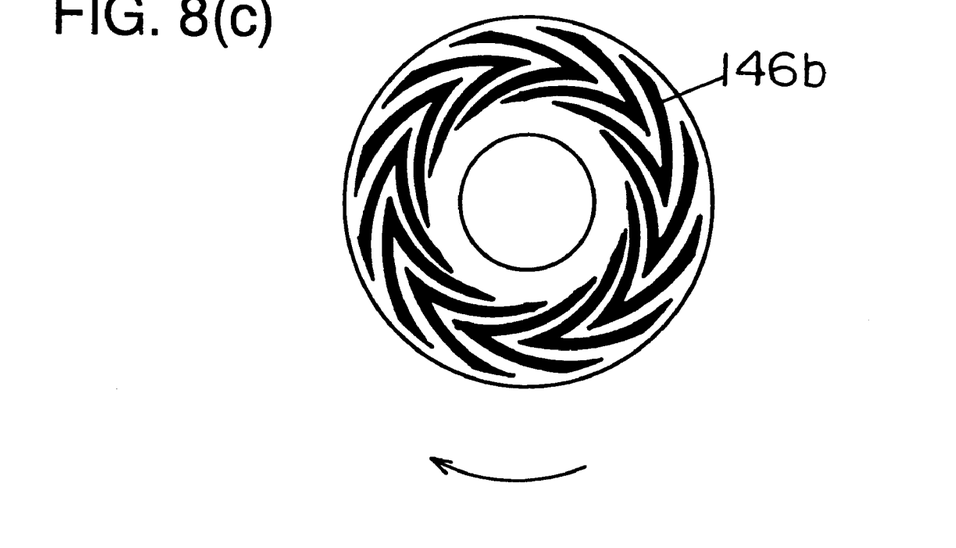
FIG. 8(c) is a bottom view of the fixed thrust ring of the motor used in the second exemplary embodiment of the present invention.

A thrust dynamic bearing includes:
a fixed thrust ring 141, and herringbone grooves 146a shown in FIG. 8(a) and 146b in FIG. 8(c), which are formed on both sides of the ring 141.

The thrust dynamic bearing further includes sleeve 139,
a rotating thrust ring 142, and
lubricating fluid 164b.

The fixed thrust ring 141 is fixed securely on the upper end of the shaft 140 by a top screw 143. A first thrust face 144 of the fixed thrust ring 141 is directly opposed to a thrust face 145 formed on the upper section of the sleeve 139.

FIG. 8(a) is a top view of a fixed thrust ring 141 of the motor used in the second exemplary embodiment. FIG. 8(b) is a cross section viewed from the front of the fixed thrust ring 141. FIG. 8(c) is a bottom view thereof.

The fixed thrust ring has two thrust faces, namely, the first thrust face 144 (rear side) and a second thrust face 171 (front side), both have respective herringbone grooves 146b and 146a. The first thrust face 144 is opposed to the thrust face 145 of the sleeve 139. The motor shaft 140 is supported in a contact-free manner in the thrust direction by the dynamic pressure produced through pumping operation of the lubricating fluid 164b applied between the thrust face 145 of the sleeve 139 and the first thrust face 144 having the herringbone grooves 146b.

The second thrust face 171 of the fixed thrust ring is opposed to a thrust face 172 of the rotating thrust ring 142. The motor shaft 140 is supported in the thrust direction in a contact-free manner by the dynamic pressure produced through pumping operation of the lubricating fluid 164b applied between the thrust face 172 of the rotating thrust ring 142 and the second thrust face 171 having the herringbone grooves 146a.

The arrows shown in FIGS. 8(a) and 8(c) indicate the rotational direction of the sleeve 139.

As described above, the thrust dynamic bearing comprises the first thrust face 144 and the second thrust face 171 of the fixed thrust ring 141.

The shaft 140, top screw 143, sleeve 139, fixed thrust ring 141 and rotating thrust ring 142 are made of metallic materials. These elements have mechanical rigidities which are sufficient to bear their own spinning at a high speed and the load from the spinning discs. And yet, the shaft 140 and the sleeve 139 can be processed for better accuracy in their respective outer and inner radial directions.

A stator core 151 wound with stator coil 150 is fixed to a bracket 154. The driving force for the motor is produced through the following processes. A current is applied to the stator coils 15 to energize the stator core 24 so as to produce a rotating-magnetic-field. Magnets 152 surrounding the stator core 151 are multipolar-magnetized. The rotating-magnetic-field and the magnets 152 produce the driving force for the motor. The magnet 152 is mounted to an inside of a rotor frame 153 which is fixed to an inner circle of the hub 138. An entire rotor comprises the hub 138, rotating thrust ring 142, sleeve 139, rotor frame 153 and magnet 152. The rotor spins the discs which are fixedly mounted to the hub 138.

The motor is assembled through the following steps. The stator core 151, wound with the stator coil 150, is fixedly mounted to a bracket 153, thereby forming a bracket assembly 155. The magnet 152 and the hub 138, having the rotor frame 153 are fixed to the sleeve 139, thereby forming a sleeve assembly 156. The sleeve 139 and the hub 138, both are constituents of the sleeve assembly 156, can be integrated into one unit. In this case, copper alloy or aluminum alloy is appropriate for the base material of the unit. The fixed thrust ring is clamped with the top screw 143 on the upper end of the shaft 140, thereby forming a shaft assembly 157. These three elements can be integrated into one unit.

The lubricating fluid is applied to the inner wall of the sleeve 139, then the shaft 140 of the shaft assembly 157 is inserted into the inner wall. Next, the rotating thrust ring 142 is mounted on the hub 138, thereby forming a component unit 162.

The component unit 162 comprises the sleeve assembly 156, shaft assembly 157, rotating thrust ring 142, radial dynamic pressure bearing, thrust dynamic pressure bearing, and lubricating fluid 164a, 164b, and 164c. In other words, the component unit 162 is the entire bearing excluding the bracket assembly 155.

Finally, a bottom end of the shaft 140 of the component unit 162 is inserted into an inner hole 158 of the bracket 154 of the bracket assembly 155, and the shaft 140 and bracket 154 are fixed with a screw 159. The bracket assembly 155 is thus joined to the component unit 162, and a motor 160 is completed.

An inner wall of the rotating thrust ring 142, which is located above the fixed thrust ring 141, is provided with a taper 163 in order to prevent the lubricating fluid 164a and 164b from spreading. The lubricating fluid 164a and 164b are poured into the following spaces respectively:
  (a) between the thrust face 145 of the sleeve 139 and the first thrust face 144 of the fixed thrust ring 141, and
  (b) between the second thrust face 171 of the fixed thrust ring 141 and the thrust face 172 of the rotating thrust ring 142.

When the motor 160 rotates, a centrifugal force pushes the lubricating fluid 164a downward due to the taper 163. In other words, the taper 163 functions as a centrifugal-force-seal. Even if a temperature rise expands the lubricating fluid 164a and forces the fluid 164a to flow above the top screw, the taper 163 generates a force which will push the fluid 164a downward. As a result, the taper 163 prevents the lubricating fluid 164a from moving to or spreading over the top of screw 143.

A narrow annular space is formed between the rim of top screw 143 and the inner circle of rotating thrust ring 142, thereby forming a surface tension seal 165. This structure prevents the fluid 164a from splashing, if the lubricating fluid 164a still tries to splash over the top screw 143 for some reason.

Further above the surface tension seal 165, an oil reservoir 166 is formed in order to hold the lubricating fluid that runs through the surface tension seal 165. Still further above the oil reservoir 166, another surface tension seal 167 is formed as a narrow annular space between the rim of top screw 143 and the inner circle of rotating thrust ring 142. Another oil reservoir 168 is provided, as a last resort, to prevent the lubricating oil from splashing out of the surface tension seal 167. These mechanisms thus prevent the lubricating fluid from splashing out and adhering to the discs.

The motor described in this embodiment includes the following elements:
  (a) the radial dynamic pressure bearing comprising:
    (a-1) the motor shaft 140;
    (a-2) the sleeve 139 through which the shaft 140 is inserted, and the herringbone grooves 161a and 161b formed on the inside wall of the sleeve 139; and
    (a-3) the lubricating fluid 164c in the space between the shaft 140 and the sleeve 139, the fluid 164c produces a dynamic pressure for supporting a radial load,
  (b) the thrust dynamic pressure bearing comprising:
    (b-1) the motor shaft 140;
    (b-2) the thrust ring 141 fixed to the shaft 140, and the herringbone grooves 146b and 146a formed on the first thrust face 144 and the second thrust face 171 of the ring 141; and
    (b-3) the lubricating fluid 164b in the space between the first thrust face 144 and the thrust face 145 of the sleeve 139, as well as the space between the second thrust face 171 and the thrust face 172 of the rotating thrust ring 142, the fluid 164b produces a dynamic pressure for supporting a thrust load, and
  (c) the thrust surface layer 147 formed on the thrust face 145 of the sleeve 139, the hardness of the surface layer 147 is different from that of the base material of the sleeve 139 so that the sleeve 139 is free from abrasion and seizure.

Preferably, the hardness ratio of H1/H2 ranges from 2 to 5 (inclusive both ends), and the range of H1 is 700±100 Vickers hardness. Thereby, the sleeve 139 is prevented from being worn out due to start and stop repetitions as well as an over-loaded operation.

H1 is the hardness of the radial surface layer 147 and the herringbone grooves 169, and H2 is the hardness of the base material of the sleeve 139.

Further, electroless nickel plate is applied to the thrust surface layer 147, and the layer thickness is adjusted in a range of from 3 to 10 μm (inclusive both the ends) so that the changes in groove width ratio are suppressed. As a result, the performance of the thrust dynamic pressure bearing can be stabilized.

Copper system alloy is utilized as a material of the sleeve 139, and stainless steel alloy of martensitic system is utilized as a material of the fixed thrust ring 141, and thereby the hardness range of the ring 141 becomes 700±100 Vickers hardness. As a result, the abrasion of the fixed thrust ring 141 can be reduced.

The herringbone grooves 146a and 146b can be replaced with spiral grooves without changing the effect.

(Exemplary Embodiment 3)

Figure 9A:
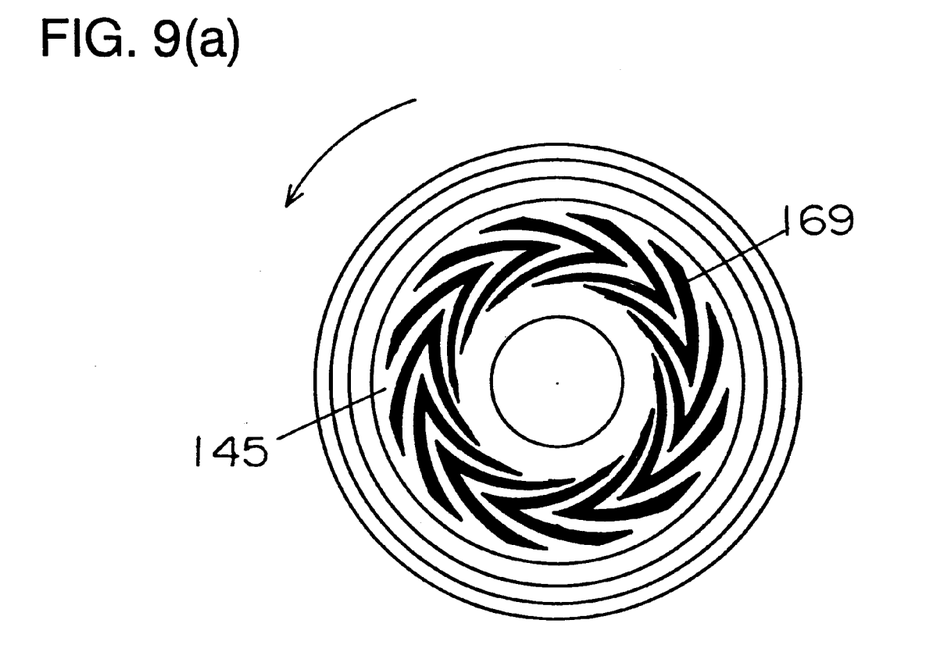
FIG. 9(a) is a top view of a motor sleeve used in a third exemplary embodiment of the present invention.
Figure 9B:
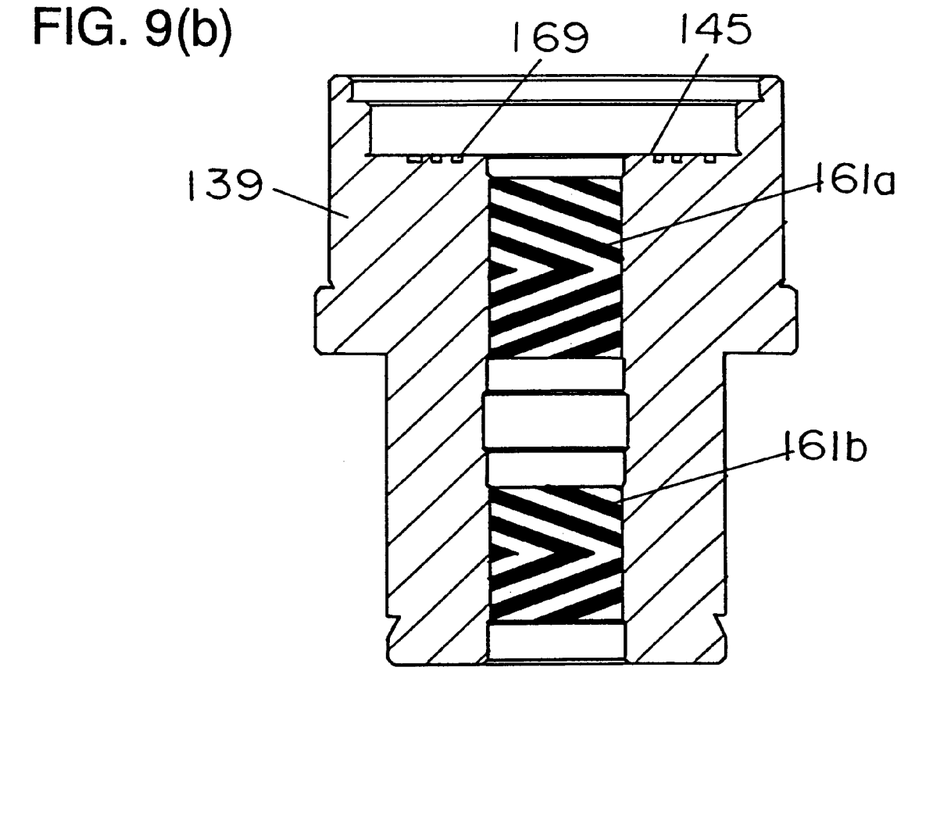
FIG. 9(b) is a cross section viewed from the front of the motor sleeve used in the third exemplary embodiment of the present invention.

FIG. 9(a) is a top view of a motor sleeve used in the third exemplary embodiment of the present invention, and FIG. 9(b) is a cross section viewed from the front of the motor sleeve. This embodiment differs from the second exemplary embodiment as the herringbone grooves 169 are formed on a thrust face 145 on the upper end of a sleeve 139. In other words, in the second exemplary embodiment, the herringbone grooves 146b are formed on the first thrust face of the fixed thrust ring 141. However, in the third embodiment the herringbone grooves 169 are formed on the thrust face 145 of the spinning sleeve 139 This change does not influence the function of the thrust dynamic pressure bearing.

Regarding the radial dynamic pressure bearing, herringbone grooves 161a and 161b are formed axially on the inner wall of the sleeve 139 with some interval, this is the same as in the second exemplary embodiment. A motor shaft 140 spins in a contact-free manner because the sleeve supports the shaft 140 via lubricating fluid applied to the herringbone grooves 161a and 161b.

An arrow shown in FIG. 9(a) indicates a rotational direction of the sleeve 139.

Figure 10:
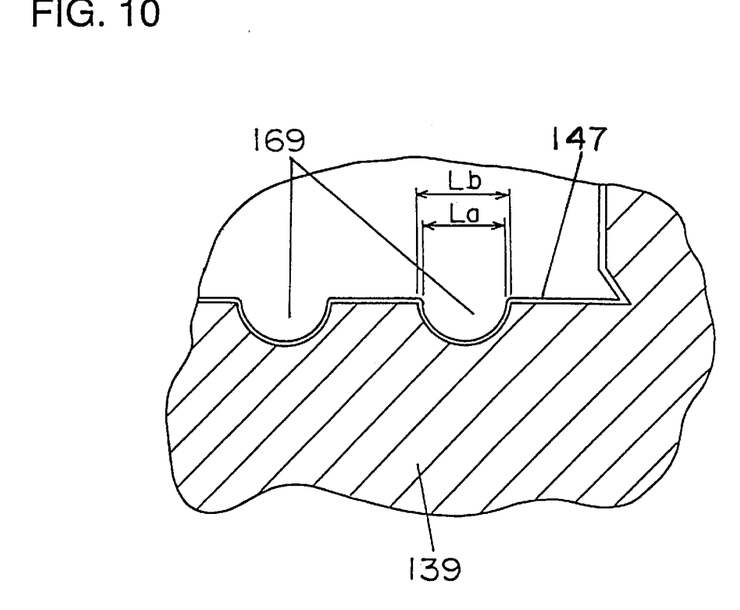
FIG. 10 is a cross section of the partially enlarged sleeve of the motor used in the third exemplary embodiment of the present invention.

FIG. 10 is a cross section of a partially enlarged sleeve 139 of the motor used in the third exemplary embodiment of the present invention.

In FIG. 10, a thrust surface layer 147 and the herringbone grooves 169 are formed on the upper end of the sleeve 139. The hardness of layer 147 and the hardness of grooves 169 are different from that of the base material of the sleeve 139.

The sleeve 139 is made of copper alloy and thus is very soft. Therefore, its surface is processed by electroless nickel plating and turned into a hard surface. The electroless nickel plating comprises mainly nickel (Ni) (90–98%) and phosphorus (P) (2–10%). The surface has thus a different hardness from the base material of the sleeve 139. The fixed thrust ring 141 is made of stainless steel of martensitic system, i.e. JIS-SUS420J2 stainless steel undergone quenching, the surface hardness range thereof is ca. 700±100 Vickers hardness.

Figure 11:
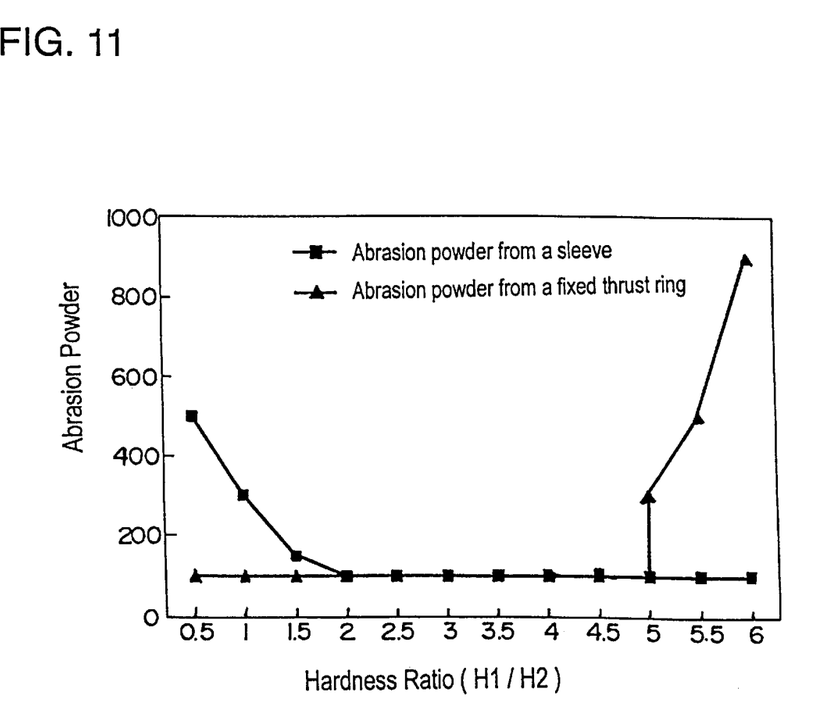
FIG. 11 is a chart illustrating a hardness ratio (H1/H2) of a thrust surface layer and herringbone grooves (H1) both located at an upper end of the sleeve vs. a base material of the sleeve (H2), the chart also illustrates a relation between abrasion powder and the hardness ratio.

FIG. 11 is a chart illustrating a hardness ratio (H1/H2) of the thrust surface layer 147 and herringbone grooves, both on the upper end of the sleeve 139 (H1) vs. the base material of the sleeve 139 (H2). The chart also illustrates a relation between abrasion powder and the ratio of the hardness (H1/H2).

In FIG. 11, the X-axis shows the ratio of H1/H2, the Y-axis shows normalized amount of abrasion powder included in the lubricating fluid poured into the space between the fixed thrust ring 141 and sleeve 139. The amount is measured after a reliability test. The amount of abrasion powder, which is included in the lubricating fluid of a motor that is judged as "good" at the reliability test, is set at "100" on the Y axis. Clearly, the less the amount of abrasion powder in the lubricating fluid, the higher the reliability of the motor.

As shown in FIG. 11, when the ratio of H1/H2 is less than "2", a large amount of the abrasion powder is produced from the sleeve 139. This is because the hard thrust ring 141 wears out the soft sleeve 139. On the contrary, when the ratio exceeds "5", a large amount of abrasion powder is produced from the fixed thrust ring 141. Since the surface layer 147 has an excessive and greater hardness than the fixed thrust ring 141 due to the hardening process, the thrust surface layer 147 of the sleeve 139 may wear out the fixed thrust ring 141.

As such, if the ratio of H1/H2 is adjusted within a proper range, the production of abrasion powder is suppressed, and the whirling accuracy of the motor is maintained. As a result, the reliability of the motor is improved. Since a magnetic disc driving apparatus, among others, is frequently operated as an outer memory of a computer, start and stop of the motor is frequently repeated. Therefore, the motor described in this exemplary embodiment has a great advantage for this type of application.

The thickness of the electroless nickel plate on thrust surface layer 147 and the herringbone 169 on upper end the sleeve 139 is sufficient, if it is not less than 3 $\mu$m, from a reliability point of view. When a thicker plating is applied to the layer 147, the same thicker plating also coats the herringbone grooves 169. Then as shown in FIG. 10, the groove width "Lb" prior to the plating changes to the narrower width "La" by approximately the thickness of the plating.

The dimensions of groove angle and width of the herringbone grooves 169 are influential factors in the production of dynamic pressure forces that realizes the contact-free rotation between the fixed thrust ring 141 and the sleeve 139. The thicker the plating, the greater the changes in the groove dimensions. The planned force of producing dynamic pressure thus cannot be obtained. This proves that the plating thickness should be maintained within a proper range.

The optimum plating thickness ranges from 3 to 10 $\mu$m, which is the same as in the second exemplary embodiment.

The herringbone grooves 169 can be replaced with a spiral groove without reducing the effect.
(Exemplary Embodiment 4)

Figure 12:
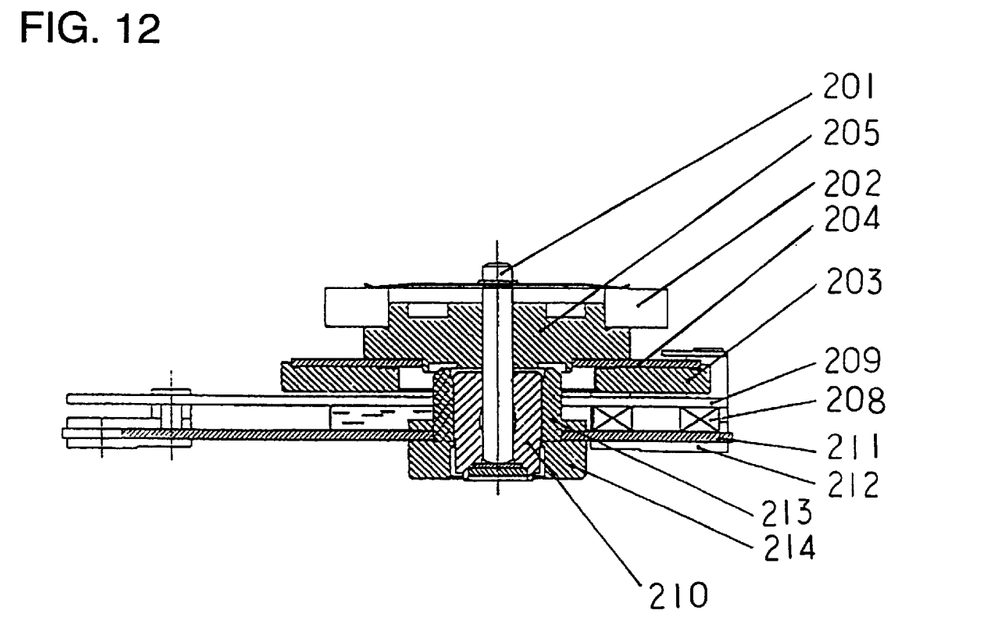
FIG. 12 is a cross section of a motor used in a fourth exemplary embodiment of the present invention.

FIG. 12 is a cross section of a motor used in the fourth exemplary embodiment. This motor is one example which can be employed in a polygon-mirror rotating apparatus such as a laser beam printer, in which laser beam scanning is adopted. In FIG. 12, a rotor boss 205 is fixed to a motor shaft 201 through a shrink fitting method or the like. A rotating polygon-mirror 202, rotor magnet 203 and rotor yoke 204 are mounted to the rotor boss 205. A rotor comprises the shaft 20, rotor boss 205, polygon-mirror 202, rotor magnet 203 and rotor yoke 204.

A bracket comprises the following elements:
  (a) a mounting face 212 of the polygon-mirror rotating apparatus;
  (b) a base plate 211 made of a magnetic body which forms a magnetic path with the rotor magnet 203; and
  (c) a collar made of resin outsert-molded with the base plate 211, the collar comprises a cylinder 213 and another cylinder 214 that has a thicker wall than the cylinder 213. The cylinder 213 is inter-fitted with a sleeve 210 that supports the shaft 201. A stator substrate 209, to which a stator coil 208 is wound, is firmly disposed between the rotor magnet 203 and the base substrate 211.

Herringbone grooves (not shown, the same as 21a and 221b shown in FIG. 2) are formed on the inner wall of the sleeve 210. Lubricating fluid is applied to the grooves, thereby forming a radial dynamic pressure bearing. The radial surface layer and the herringbone grooves of the sleeve 210 have a different hardness from that of the base material of the sleeve 210. This is the same structure as the exemplary embodiment 1, therefore, this structure can suppress the abrasion of the sleeve 210, and realize accurate rotation and a long life of the motor. The above various exemplary embodiments prove that the present invention can provide a high performance motor in which the NRRO is produced in an extremely small amount. This motor employs a hydrodynamic bearing instead of a ball bearing. Thus, when the motor starts rotating, the radial dynamic pressure bearing between the motor shaft and the sleeve, and the thrust dynamic pressure bearing between the sleeve and the fixed thrust ring are activated, and the motor continues rotating in a contact-free manner via the lubricating fluid.

In the case of the ball bearings, a shock or drop produces Brinell indentations on the lathe surface of the inner ring or outer ring of the ball bearing, thereby aggravating the noise problem. However, the hydrodynamic bearing receives a shock or a drop load on the entire sleeve, and therefore, the load pressure to the face is sufficiently smaller than in the case of the ball bearing, so that the sleeve surface is thus subject only to little indentations.

The hydrodynamic bearing can run free from outer ring, inner ring, and balls that are essential elements for the ball bearing. The volume occupied by the bearing in the motor thus decreases so that the motors and the apparatus employing the motors can readily be made smaller and thinner.

The present invention can provide an excellent motor which satisfies the demands of the market such as superior performance, low noise, thinner size, shock-resistance and long life.

The motor of the present invention can be employed in a magnetic disc driving apparatus, optical disc driving apparatus, CD-ROM driving apparatus, MD driving apparatus, DVD driving apparatus, other disc driving apparatus and apparatuses other than the disc driving apparatus such as the laser beam printer and the like. Therefore, a great industrial advantage can be expected with this motor.

The descriptions herein and the disclosure hereof are by way of illustration only and should not be construed as limiting the scope of the present invention which is more particularly pointed out by the following claims.

What is claimed is:

1. A motor comprising:

a sleeve having an inner wall provided with herringbone grooves for producing dynamic pressure, and a radial surface layer formed on said inner wall;

a motor shaft inserted in said sleeve; and lubricating fluid provided in a space between said shaft and said sleeve, wherein said sleeve, said motor shaft and said lubricating fluid define a radial dynamic bearing which permits relative rotation between said shaft and said sleeve, wherein said radial surface layer and said herringbone grooves of said inner wall of said sleeve, which form sliding regions between said shaft and said sleeve, have a different hardness relative to a hardness of a base material forming said sleeve, and wherein a thickness of said layer and grooves is within a range of from 3 to 10 $\mu$m and a hardness ratio of H1/H2 is in a range of from 2 to 5, wherein H1 is the hardness of said radial surface layer and said herringbone grooves of said inner wall of said sleeve, and H2 is a hardness of said base material of said sleeve.

2. The motor as defined in claim 1, wherein the hardness of said radial surface layer and said herringbone grooves of said inner wall of said sleeve is 700±100 Vickers hardness.

3. The motor as defined in claim 1, wherein said radial surface layer and said herring bone grooves are provided with an electroless nickel plating on said inner wall of said sleeve and said grooves have substantially the same thickness.

4. The motor as defined in claim 1, wherein said sleeve is formed of a copper system alloy, said motor shaft is formed of a stainless steel alloy of martensitic system, and a hardness range of said shaft surface is 700±100 Vickers hardness.

5. A motor comprising:

a sleeve having an inner wall which is provided with herringbone grooves for producing dynamic pressure;

a motor shaft inserted in said sleeve;

lubricating fluid provided in a space between said shaft and said sleeve, wherein said sleeve, said motor shaft, and said lubricating fluid define a radial dynamic bearing which permits relative rotation between said shaft and said sleeve;

a thrust ring fixed to said shaft; and lubricating fluid provided between a thrust face of said thrust ring and a thrust face of aid sleeve, for producing dynamic pressure supporting a thrust load, wherein said thrust ring, said shaft and said lubricating fluid define a thrust dynamic pressure bearing, wherein one of herringbone grooves and spiral grooves are provided in at least one of said thrust faces of said thrust ring and said sleeve, wherein a thrust surface layer is formed on said sleeve thrust face forming a sliding region with said ring thrust face, so that a hardness of said thrust surface layer is different from that of a base material of said sleeve, and wherein a thickness of said thrust surface layer is within a range of from 3 to 10 $\mu$m, and a hardness ratio of H1/H2 is 2–5, where H1 is the hardness of thrust surface layer of the sleeve thrust face, H2 is a hardness of said base material of said sleeve.

6. The motor as defined in claim 5, wherein H1 is 700±100 Vickers hardness.

7. The motor as defined in claim 5, wherein an electroless nickel plating forms said thrust surface layer of said sleeve thrust face.

8. The motor as defined in claim 5, wherein said sleeve comprises copper system alloy, said thrust ring comprises stainless steel of martensitic system, and a hardness range of said ring thrust surface has a hardness in a range of 700±100 Vickers hardness.

* * * * *